(12) United States Patent
Kuroki

(10) Patent No.: US 11,693,119 B2
(45) Date of Patent: Jul. 4, 2023

(54) LASER RADAR FOR WORK VEHICLE WITH ATTENUATION LAYER

(71) Applicant: Kubota Corporation, Osaka (JP)

(72) Inventor: Toshiaki Kuroki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 1029 days.

(21) Appl. No.: 16/424,488

(22) Filed: May 29, 2019

(65) Prior Publication Data

US 2019/0377091 A1 Dec. 12, 2019

(30) Foreign Application Priority Data

Jun. 8, 2018 (JP) .................... 2018-110538

(51) Int. Cl.
*G01S 7/481* (2006.01)
*G01S 17/931* (2020.01)
*G01S 7/495* (2006.01)

(52) U.S. Cl.
CPC ............ *G01S 17/931* (2020.01); *G01S 7/481* (2013.01); *G01S 7/4813* (2013.01); *G01S 7/4816* (2013.01); *G01S 7/495* (2013.01)

(58) Field of Classification Search
CPC .... G01S 17/931; G01S 7/4813; G01S 7/4816; G01S 7/481; G01S 7/495; G01S 17/42; G01S 7/4815; G01S 7/4808; G01S 13/931; G01S 17/04; G02B 19/0052; G02B 19/0085; G02B 27/0977; G02B 6/0016

See application file for complete search history.

(56) References Cited

U.S. PATENT DOCUMENTS

| 6,265,725 B1* | 7/2001 | Moll ....................... G01S 17/04 |
| | | 250/559.38 |
| 2003/0107721 A1* | 6/2003 | Shirai ................... G01S 7/4812 |
| | | 356/4.01 |
| 2018/0027179 A1 | 1/2018 | Matsuzaki et al. |
| 2018/0224530 A1* | 8/2018 | Ishikawa ............... G01S 7/4816 |
| 2018/0329036 A1* | 11/2018 | Huebner ............... G01S 7/4813 |
| 2020/0274311 A1* | 8/2020 | Shand .................... G01S 17/931 |

FOREIGN PATENT DOCUMENTS

| DE | 202018102578 U1 | 6/2018 |
| EP | 3091342 | 11/2016 |
| EP | 3104190 | 12/2016 |
| JP | 04-291190 | 10/1992 |
| JP | 2017106745 A * | 6/2017 |
| JP | 2018-014554 | 1/2018 |

OTHER PUBLICATIONS

Extended European Search Report for corresponding EP Application No. 19178416.4-1206, dated Nov. 7, 2019.

* cited by examiner

*Primary Examiner* — Jennifer D Bennett
*Assistant Examiner* — Erin R Garber
(74) *Attorney, Agent, or Firm* — Mori & Ward, LLP

(57) ABSTRACT

A laser radar for a work vehicle includes a light emitter, a light receiver, and a light attenuation layer. The light emitter is configured to emit a laser light. At least part of the laser light is reflected as a reflected light. The light receiver is configured to receive the reflected light. The light attenuation layer is provided to weaken the reflected light such that the light receiver is configured to receive the reflected light which has been weakened via the light attenuation layer.

19 Claims, 6 Drawing Sheets

LASER RADAR FOR WORK VEHICLE WITH ATTENUATION LAYER

CROSS-REFERENCE TO RELATED APPLICATIONS

The present application claims priority under 35 U. S. C. § 119 to Japanese Patent Application No. 2018-110538, filed Jun. 8, 2018. The contents of this application are incorporated herein by reference in their entirety.

BACKGROUND OF THE INVENTION

Field of the Invention

The present invention relates to a laser radar for a work vehicle.

Discussion of the Background

A tractor according to JP 2018-014554 A includes, as obstruction detection sensors, four laser radars each having a scan range exceeding an angle of 90° to detect obstructions present around a vehicle body. The laser radars are also collectively referred to as Light Detection and Ranging (LIDAR). An obstruction detection processing part configured to process signals from the laser radars calculates a width in a horizontal direction of an obstruction being detected and a distance from the vehicle body to output obstruction detection information. Based on the obstruction detection information, a travel controller causes the vehicle body to decelerate or stop, or executes a steering maneuver to avoid the obstruction.

Laser light used in the laser radars can advance straight ahead to detect an obstruction at a remote position. However, laser light can be reflected by suspended matters, such as earth dust, snowflakes, rain drops, and fog drops. Therefore, an aggregate of such suspended matters may sometimes be erroneously detected as an obstruction, such as a human or a wall body.

JP H04-291190 A discloses a device mounted on a car and configured to use laser light to detect an inter-vehicular distance from the car to a proceeding car. In the inter-vehicular distance detection device, a threshold value of detecting reflected light is changed in accordance with a rainfall amount detected by a rainfall amount detector. That is, such a method has been proposed that, when intensity of light reflected by rain drops is greater because of heavy rain, the threshold value is increased, and, when intensity of light reflected by rain drops is smaller because of gentle rain, the threshold value is reduced, to effectively detect, while negative effects of light reflected by rain drops are avoided, light reflected by a proceeding car.

SUMMARY OF THE INVENTION

A laser radar for a work vehicle includes a light emitter, a light receiver, and a light attenuation layer. The light emitter is configured to emit a laser light. At least part of the laser light is reflected as a reflected light. The light receiver is configured to receive the reflected light. The light attenuation layer is provided to weaken the reflected light such that the light receiver is configured to receive the reflected light which has been weakened via the light attenuation layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
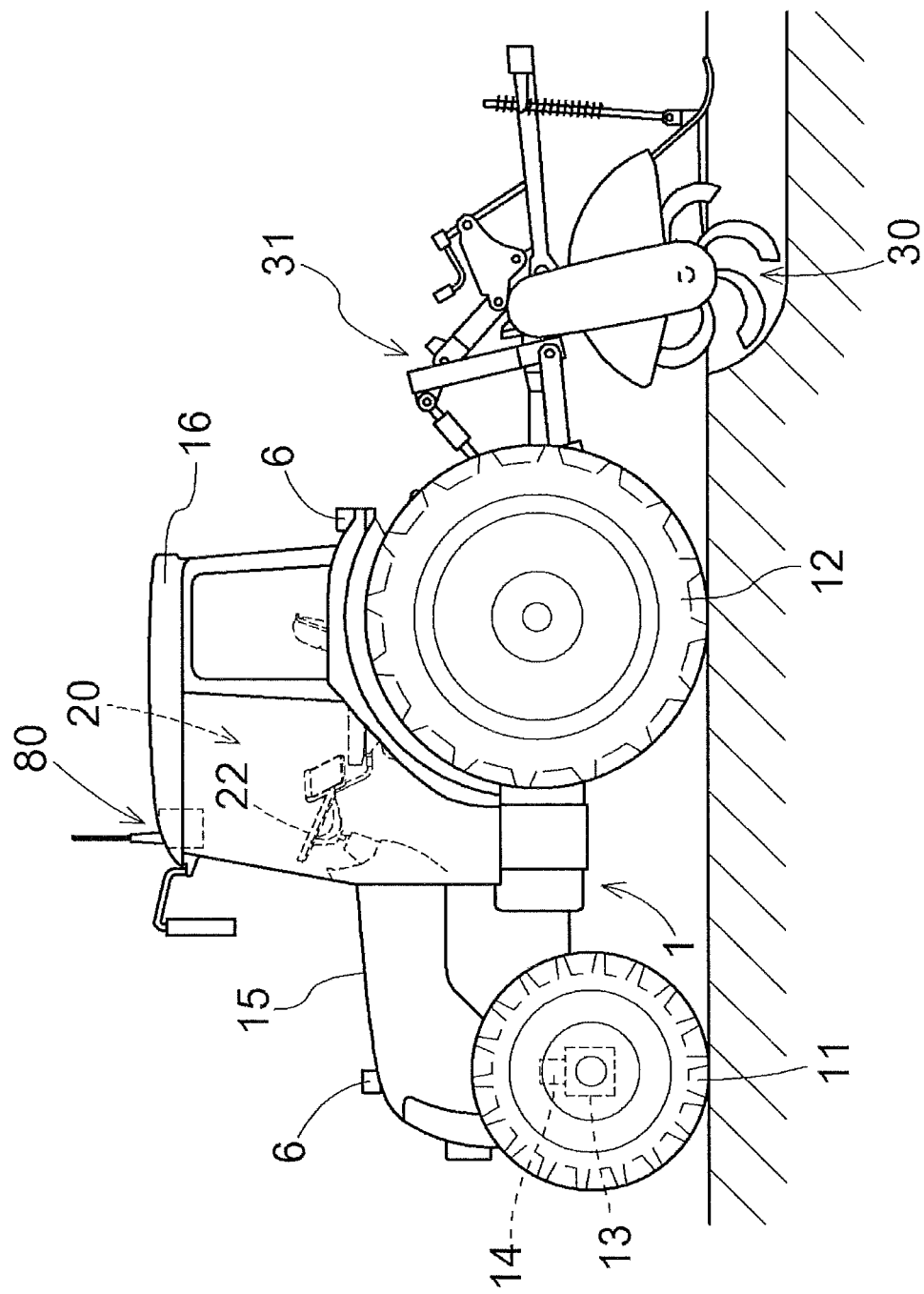
FIG. 1 is a side view of a tractor representing an example of a work vehicle provided with laser radars.

The embodiments will now be described with reference to the accompanying drawings, wherein like reference numerals designate corresponding or identical elements throughout the various drawings.

Such a laser radar device, as illustrated in JP H04-291190 A, that a threshold value of detecting reflected light is adjusted based on a control signal output from a special control circuit may sometimes become expensive. A production number of work vehicles is smaller than a production number of passenger cars, for example. For such work vehicles, a cost reduction through mass production is therefore difficult. To reduce its production cost, use of a general-purpose laser radar device with no special specifications is required.

Therefore, such technology has been demanded that uses a commercially-available, cost effective general-purpose laser radar to suppress, without requiring a special control circuit configured to prevent erroneous detection described above, suspended matters, such as earth dust, snowflakes, rain drops, and fog drops, from being erroneously detected as an obstruction.

Next, a work vehicle provided with laser radars 6 according to the present invention to detect an obstruction will be described herein with reference to the accompanying drawings. In an embodiment illustrated in FIG. 1, the work vehicle is a tractor capable of automatically traveling in an agricultural field (work field) and of performing tasks.

As illustrated in FIG. 1, the tractor is provided with a driving part 20 at a center part of a vehicle body 1 supported by front wheels 11 and rear wheels 12. At a rear part of the vehicle body 1, a work device 30 that is a rotary cultivator is provided via a hydraulic type lift mechanism 31. The front wheels 11 function as steering control wheels. Changing its steering angle changes a travel direction of the tractor. The steering angle of the front wheels 11 is changed through an operation of a steering mechanism 13. The steering mechanism 13 includes a steering motor 14 for automatic steering. For manual traveling, the front wheels 11 are steered through an operation of a steering wheel 22 disposed on the driving part 20. On a ceiling part of a cabin 16, a satellite positioning module 80 configured to serve as a global navigation satellite system (GNSS) module is provided. As a component of the satellite positioning module 80, a satellite antenna configured to receive GNSS signals (including global positioning system (GPS) signals) is attached in a ceiling area of the cabin 16. To complement satellite navigation, the satellite positioning module 80 may be combined with an inertial navigation module including a gyro acceleration sensor and a magnetic direction sensor. Obviously, the inertial navigation module may be provided at another location than the satellite positioning module 80.

Figure 2:
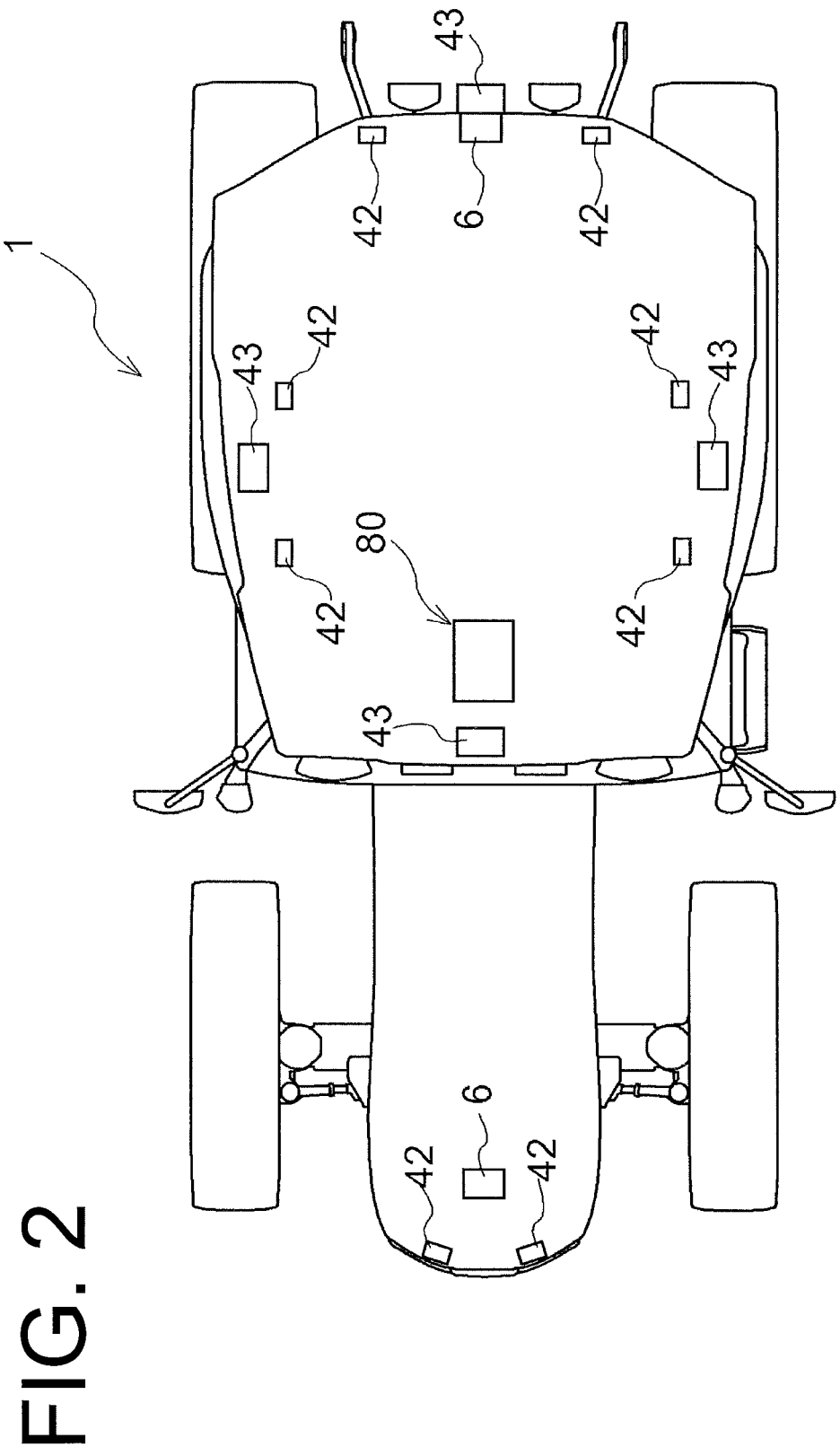
FIG. 2 is a schematic plan view of the tractor, illustrating obstruction sensors provided to the tractor.

As schematically illustrated in FIG. 1, the laser radars 6 are provided at a front end part of a bonnet 15 of the tractor and a rear end part of the cabin 16 covering the driving part 20. As schematically illustrated in FIG. 2, the vehicle body 1 of the tractor is further provided with ultrasonic sensor units 42 serving as obstruction sensors, in addition to the laser radars 6. The ultrasonic sensor units 42 being provided are eight in total, two on a front part, two on a rear part, two on a left part, and two on a right part of the vehicle body 1. Therefore, proximal obstructions in a substantially entire periphery area around the vehicle body 1 are detected. Cameras 43 being further provided to the vehicle body 1 are four in total, one on the front part, one on the rear part, one on the left part, and one on the right part of the vehicle body 1. Therefore, images of an entire periphery area of the vehicle body 1 are captured. Images captured by and output from the four cameras 43 are used as monitoring images with no change, or are used as an original image of an overlooking image generated through viewpoint conversion processing.

Figure 3:
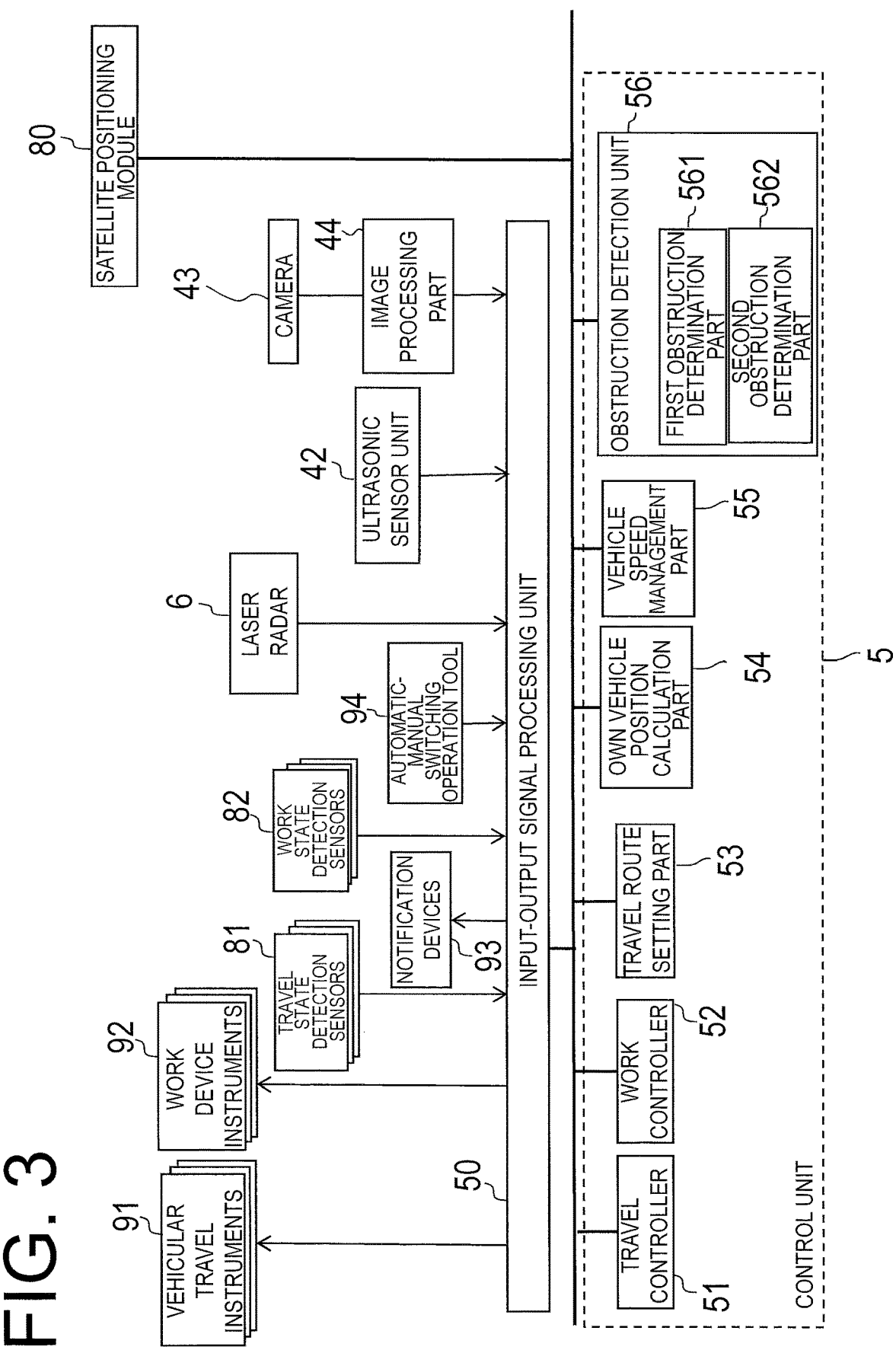
FIG. 3 is a functional block diagram illustrating functions of a control system of the tractor.

FIG. 3 illustrates a control system provided in the tractor. The control system according to the embodiment includes a control unit 5 including on-vehicle electronic control units (ECUs), and an input-output signal processing unit 50. In addition to function parts configured to execute ordinary work-related traveling, the control unit 5 further includes a function part configured to use a result of detections by the laser radars 6 and the ultrasonic sensor units 42 to execute obstruction collision avoidance. The input-output signal processing unit 50 includes a function part configured to process input-output signals to be handled while the tractor performs work-related traveling. The control unit 5 and the input-output signal processing unit 50 are coupled with each other via an on-vehicle local area network (LAN). The satellite positioning module 80 is also coupled to the on-vehicle LAN.

The input-output signal processing unit 50 is coupled with the laser radars 6 and the ultrasonic sensor units 42. In FIG. 3, the cameras 43 are coupled to an image processing part 44. The image processing part 44 generates a monitoring image from images captured by and obtained from the cameras 43. A result of processing by the image processing part 44 is entered into the input-output signal processing unit 50.

The input-output signal processing unit 50 is further coupled with vehicular travel instruments 91, work device instruments 92, notification devices 93, an automatic-manual switching operation tool 94, travel state detection sensors 81, and work state detection sensors 82. The vehicular travel instruments 91 include control instruments associated with the steering motor 14 (see FIG. 1), and a transmission mechanism and an engine unit controlled when the vehicle travels, for example. The work device instruments 92 include control instruments used to drive the work device 30 and the lift mechanism 31 (see FIG. 1). The notification devices 93 include a display, a speaker, lamps, and a buzzer, for example, configured to notify, to a driver or a supervisor, vehicle speed, engine speed, and remaining fuel amount, for example, as well as to notify cautions on work-related traveling. The automatic-manual switching operation tool 94 is a switch used to select either of an automatic traveling mode at which the vehicle travels under automatic steering and a manual traveling mode at which the vehicle travels under manual steering. For example, when the automatic-manual switching operation tool 94 is operated while the vehicle is traveling in the automatic traveling mode, the mode is switched and the vehicle travels under manual steering. When the automatic-manual switching operation tool 94 is operated while the vehicle is traveling under manual steering, the mode is switched and the vehicle travels under automatic steering.

The travel state detection sensors 81 include sensors configured to detect a travel state including steering angle, engine speed, and shift state, for example. The work state detection sensors 82 include a use-form detection sensor configured to detect a use form, such as orientation, height above ground, and use width, for example, of the work device 30.

As the input-output signal processing unit 50 includes a communication function part configured to exchange data with an external computer in conformity to a wireless communication standard or a wired communication standard, the control system of the tractor can exchange data with a management computer used in a management center at a remote location, for example, and a computer held by a driver or a supervisor, such as a tablet computer or a smartphone (mobile phone), for example.

The control unit 5 includes a travel controller 51, a work controller 52, a travel route setting part 53, an own vehicle position calculation part 54, a vehicle speed management part 55, and an obstruction detection processing unit 56. The travel route setting part 53 is configured to develop in a readable manner in a memory a travel route serving as a target travel route for automatic traveling. A travel route may be generated in the control unit 5, or may be generated by another computer and downloaded to the control unit 5 via the input-output signal processing unit 50. Based on positioning data from the satellite positioning module 80 adopted with a GPS, for example, the own vehicle position calculation part 54 calculates a coordinate position of the vehicle body 1 on a map.

The travel controller 51 includes an automatic traveling control function (automatic traveling mode) and a manual traveling control function (manual traveling mode). When the automatic traveling mode is selected, the travel controller 51 obtains, during automatic traveling, a difference between an own vehicle position from the own vehicle position calculation part 54 and a travel route set by the travel route setting part 53, and calculates a steering instruction and a vehicle speed instruction to reduce the difference. The work controller 52 provides, to the work device instruments 92, required control signals in accordance with the own vehicle position. When the manual traveling mode is selected, the work controller 52 performs manual traveling based on an operation of the steering wheel 22 by a driver. The work controller 52 further controls the work device instruments 92 based on operations of the operation tools.

The obstruction detection processing unit 56 includes a first obstruction determination part 561 configured to determine an obstruction based on detection information from the laser radars 6, and a second obstruction determination part 562 configured to determine the obstruction based on sensor signals from the ultrasonic sensor units 42.

During automatic traveling controlled by the travel controller 51, the obstruction detection processing unit 56 detects an obstruction in front of the vehicle body 1 in a travel direction, and, when a distance between the vehicle body 1 and the obstruction falls within a predetermined range, the vehicle body 1 is caused to decelerate or stop.

Figure 4:
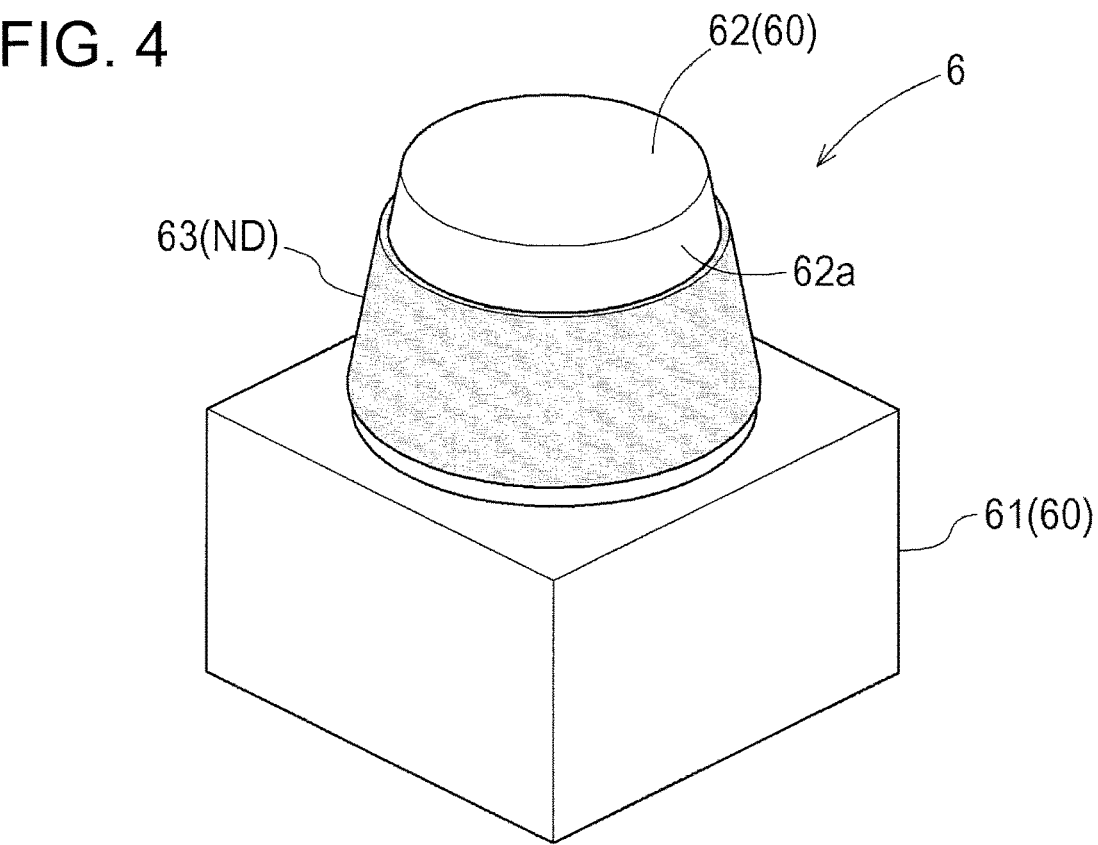
FIG. 4 is a perspective view of a laser radar according to a first embodiment.
Figure 5:
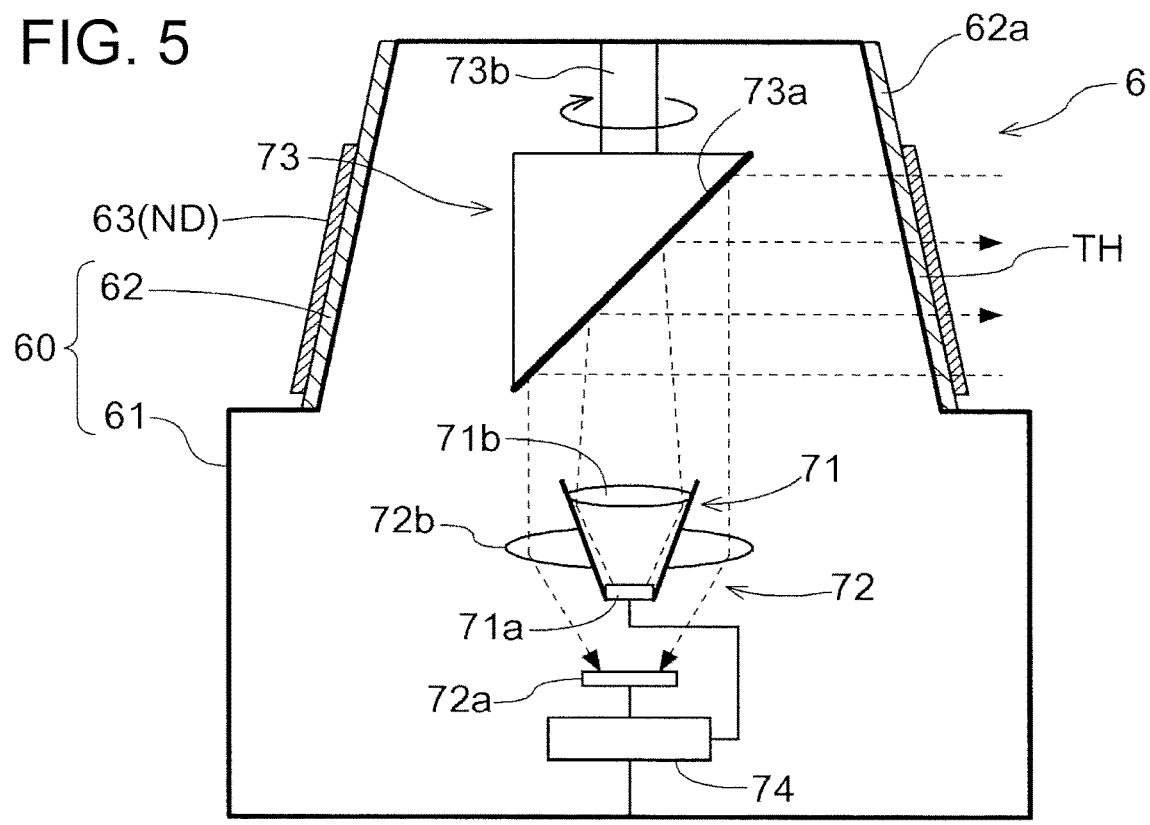
FIG. 5 is a cross-sectional view schematically illustrating a structure of the laser radar.
Figure 6:
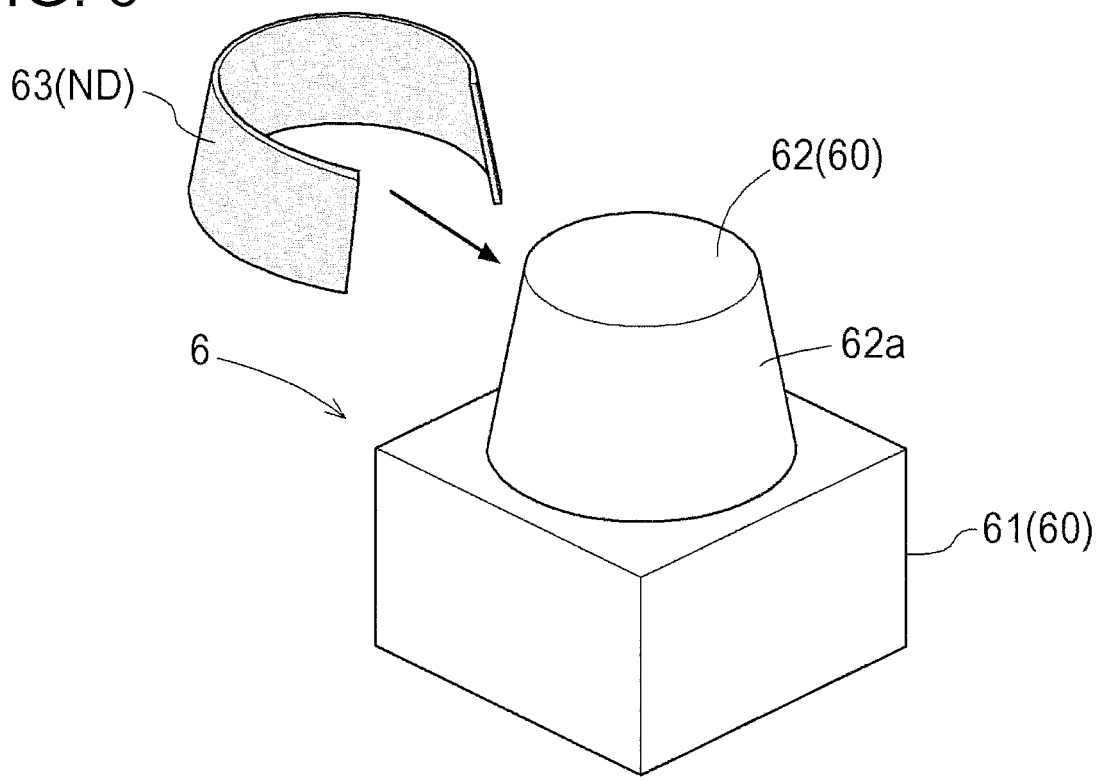
FIG. 6 is a perspective view illustrating the laser radar before a dimming sheet is applied to a hood.

Next, the laser radars 6 according to the embodiment will now be described with reference to the accompanying drawings. FIG. 4 is a perspective view of one of the laser radars 6. FIG. 5 is a cross-sectional view schematically illustrating a structure of the one of the laser radars 6. An internal structure of each of the laser radars 6 is covered by a base 61 having a substantially rectangular parallelepiped shape, and a housing 60 including a hood 62 having a truncated cone shape and attached to an upper surface of the base 61. The hood 62 is made of a transmittance material. Laser light projected from each of the laser radars 6 and laser light reflected by and returned from a reflection body (reflected light) pass through a peripheral wall 62a of the hood 62. A transmission area TH on the peripheral wall 62a of the hood 62 allows laser light to pass through, and is applied with a dimming sheet (a light attenuation sheet) 63 serving as a dimming layer (a light attenuation layer) ND. The dimming sheet 63 is also referred to as a mirror sheet (mirror dimming sheet) configured to allow light incident on one surface (reflection surface) to be partially reflected, but to rarely allow light incident on another surface (non-reflection surface) to be reflected. As illustrated in FIG. 6, when the sheet is to be applied, the non-reflection surface is allowed to come into close contact with a surface of the peripheral wall 62a of the hood 62 to allow the reflection surface to face outside.

As illustrated in FIG. 5, the internal structure of each of the laser radars 6 includes a light projector (a light emitter) 71 configured to project laser light at an area around the vehicle body, a light receiver 72 configured to receive reflected light that is the laser light reflected by a reflection body present around the vehicle body, a rotary type deviation unit 73 configured to deflect the laser light and the reflected light at an angle of 90 degrees, and an evaluation unit 74.

The light projector 71 includes a laser light source 71a and a projection optical system 71b, and is configured to generate laser light to be projected. The laser light being generated and deflected by the deviation unit 73 at an angle of approximately 90 degrees passes through the dimming sheet 63 from the transmission area TH on the peripheral wall 62a of the hood 62 and exits toward an area around the vehicle body. The light receiver 72 includes a reception optical system 72b and a photodiode 72a, and is configured to measure intensity of light passed through the dimming sheet 63 and the hood 62 and reflected and deflected at an angle of approximately 90 degrees by the deviation unit 73.

The deviation unit 73 includes a deflection mirror 73a, and a rotation mechanism 73b configured to rotate the deflection mirror 73a around a vertical central axis. The vertical central axis aligns with an optical center line of the projection optical system 71b and the reception optical system 72b.

As the deflection mirror 73a is continuously rotated and driven by the rotation mechanism 73b, laser light scans in a planar manner an area around the vehicle body. As a scan angle of each of the laser radars 6 is set to 270°, reflection bodies (obstructions) present at several meters within ranges each expanding at an angle of 270° in front of and behind the vehicle body 1 are detected.

[Another Embodiment]

Figure 7:
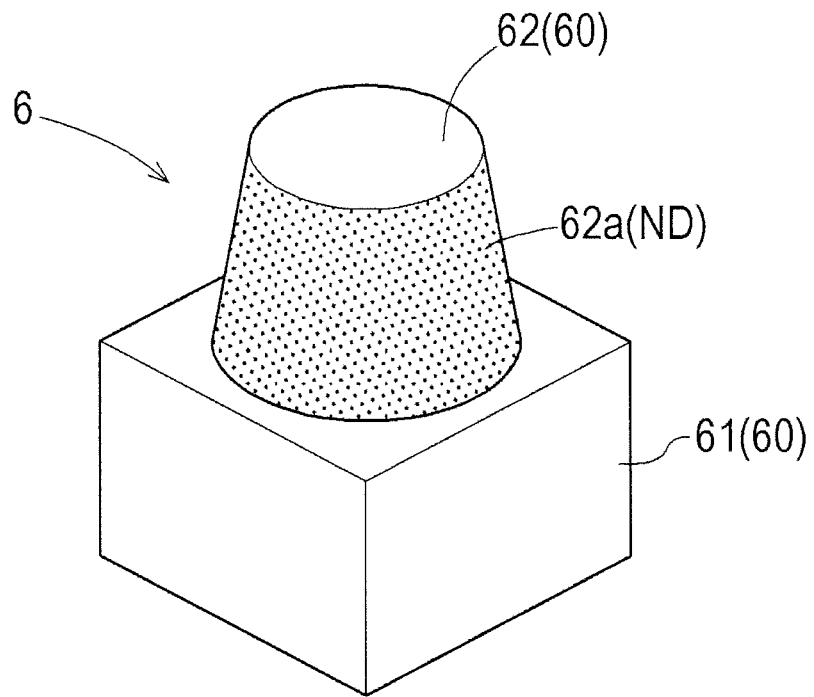
FIG. 7 is a perspective view illustrating a laser radar according to a second embodiment.

(1) FIG. 7 illustrates one of laser radars 6 according to a second embodiment. An internal structure and a housing 60 of each of the laser radars 6 are substantially identical in shape to the internal structure and the housing 60 of each of the laser radars 6 according to the first embodiment. A different point is that the dimming sheet 63 serving as the dimming layer ND is not applied to a peripheral wall 62a of a hood 62, but the peripheral wall 62a has optical properties similar to the optical properties of the dimming sheet 63. That is, a dimming layer ND is integrally formed with the peripheral wall 62a of the hood 62. In the embodiment, a surface of the peripheral wall 62a may be allowed to undergo a mirror treatment to achieve effects similar to the effects of the first embodiment where the mirror sheet is applied.

Figure 8:
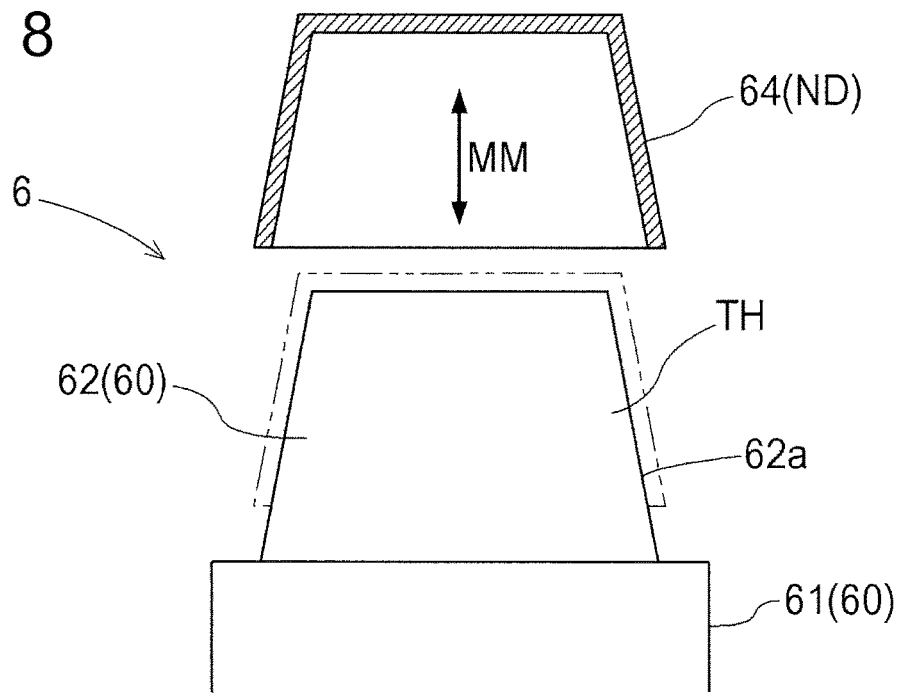
FIG. 8 is a cross-sectional view illustrating a laser radar according to a third embodiment.

(2) FIG. 8 illustrates one of laser radars 6 according to a third embodiment. Although an internal structure and a housing 60 of each of the laser radars 6 are substantially identical in shape to the internal structure and the housing 60 of each of the laser radars 6 according to the first embodiment, the dimming sheet 63 serving as the dimming layer ND is not applied to a peripheral wall 62a of a hood 62. The function of the dimming layer ND is achieved by a dimming filter 64 having a curved plate shape disposed to cover a transmission area TH on the peripheral wall 62a. The dimming filter 64 may be provided with a transfer mechanism MM to allow the dimming filter 64 to be selectively movable between a position at which the dimming filter 64 covers the transmission area TH (an acting position at which laser light and the reflected light are allowed to pass through) and a position at which the dimming filter 64 is moved away from the transmission area TH (an evacuation position at which the reflected light is not allowed to pass through). In this case, when suspended matters, such as dust, snowflakes, rain drops, and fog drops, are present, the dimming filter 64 is moved to the acting position. When no suspended matter is present, the dimming filter 64 is moved to the evacuation position. An outside surface of the dimming filter 64 may be allowed to undergo a mirror treatment to achieve a mirror dimming filter.

Figure 9:
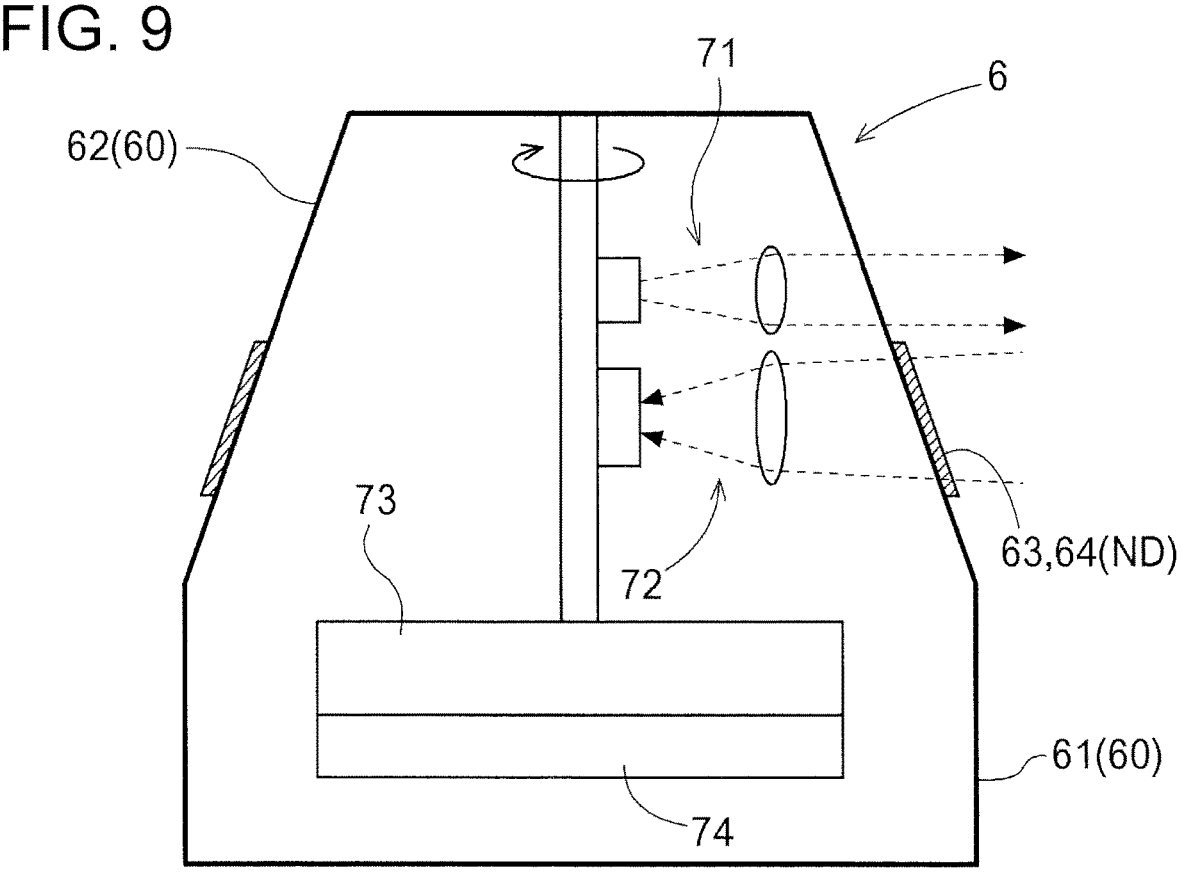
FIG. 9 is a cross-sectional view illustrating a laser radar according to a fourth embodiment.

(3) FIG. 9 illustrates one of laser radars 6 according to a fourth embodiment. A difference of the embodiment from the embodiments described above is that a laser light transmission area from which radar light exits from inside to outside of a hood 62, and a reflected light transmission area into which radar light enters from the outside to the inside of the hood 62 differ from each other. Therefore, a dimming layer ND (a dimming sheet 63 and a dimming filter 64) is provided in the reflected light transmission area only.

(4) In the laser radars 6 according to the embodiments described above, the laser radars 6 being disposed on the front part and the rear part of the vehicle body 1 are two in total. However, at least one laser radar 6 may be disposed on the vehicle body 1 to face in an advancing direction, or three or more laser radars 6 may be disposed.

(5) In the embodiments described above, the tractor equipped with the cultivator is illustrated as the work vehicle. However, the present invention is applicable to a tractor equipped with the work device 30 other than a cultivator, and, further, to agricultural vehicles including combine harvesters and rice transplanters, for example, and construction vehicles, for example. Furthermore, the tractor described above can select automatic traveling and manual traveling. However, the present invention is applicable to a tractor in which manual traveling is only available.

A laser radar mounted on a work vehicle, according to the present invention, includes a light projector configured to project laser light at an area around a vehicle body, a light receiver configured to receive reflected light, the reflected light being the laser light reflected by a reflection body present around the vehicle body, a hood having a transmission area allowing either of or both of the laser light and the reflected light to pass through, the hood covering the light projector and the light receiver, and a dimming layer formed at least on the transmission area of the hood.

In the configuration, as laser light that is reflected light projected from the light projector and reflected by and returned from the reflection body present around the vehicle body passes through the dimming layer, its intensity reduces. Intensity of not only reflected light reflected by suspended matters, such as earth dust, snowflakes, rain drops, and fog drops, but also reflected light reflected by a reflection body, such as a human, an animal, or a vehicle, which needs to be originally detected, also reduces. However, as the reflection body that needs to be originally detected by using the laser radar according to the present invention has a greater reflection area than each of the suspended matters, such as earth dust, snowflakes, rain drops, and fog drops, even when reflected light having greater intensity, which is reflected by a human, an animal, or a vehicle, passes through the dimming layer, and intensity of the reflected light reduces, the reduction does not greatly affect the reflected light. That is, as a signal (S)/noise (N) of a detection signal based on reflected light reflected by a human, an animal, or a vehicle is greater than an S/N of a detection signal based on reflected light reflected by each of suspended matters, such as dust, snowflakes, rain drops, and fog drops, a reduction in intensity of radar light due to the dimming layer avoids erroneous detection due to dust, snowflakes, rain drops, and fog drops, for example, but does not prevent humans, animals, and vehicles, for example, which need to be originally detected, from being detected.

In a preferable embodiment of the present invention, the dimming layer is a dimming sheet applied to the hood. In the configuration, forming of the dimming layer through simple application of a dimming sheet onto a hood is advantageous in production cost.

In a more preferable embodiment, the dimming sheet is a dimming sheet configured to greatly dim, than light passing through the hood from the inside to the outside, light passing through the hood from the outside to the inside. A dimming sheet commercially available as a mirror sheet has such specifications. In the configuration, due to the surface reflection properties of the dimming sheet serving as the mirror sheet, a reduction in intensity of reflected light entering into the light receiver becomes greater than a reduction in intensity of laser light projected from the light projector. As intensity of laser light projected from the light projector does not relatively greatly lower, a reflection body is irradiated with the laser light with less lowered intensity. Intensity of its reflected light however relatively greatly lowers due to the mirror sheet. Therefore, an S/N of a detection signal based on reflected light reflected by a human, an animal, or a vehicle becomes greater than an S/N of a detection signal based on reflected light reflected by each of suspended matters, such as dust, snowflakes, rain drops, and fog drops. Therefore, even in an environment where suspended matters, such as dust, snowflakes, rain drops, and fog drops, are present, an obstruction, such as a human or a wall body, can be effectively detected.

When an emission light transmission area allowing laser light projected from the light projector to pass through the hood, and a reflected light transmission area allowing reflected light to pass through the hood are substantially separated from each other, forming the dimming layer only on an area allowing the reflected light to pass through can achieve effects similar to the effects when a mirror sheet is used as the dimming sheet described above.

When a laser radar including a light projector and a light receiver covered with a hood made of a transmittance material is used, replacing the hood with a hood made of a material with less transmittance, that is, a material with a greater degree of dimming can achieve effects identical to the effects of an ordinary hood applied with a dimming sheet. Therefore, in a preferable embodiment of the present invention, the dimming layer is integrally formed on the hood.

The effects of the dimming layer described above are advantageous in a situation where suspended matters, such as dust, snowflakes, rain drops, and fog drops, are present. However, the dimming layer is not required in a situation where such suspended matters are not present. Therefore, it is preferable that whether a dimming layer is present be selected depending on a situation. Therefore, in a preferable embodiment of the present invention, the dimming layer is a dimming filter selectively movable between an acting position allowing the laser light and the reflected light to pass through and an evacuation position disallowing the laser light and the reflected light to pass through. Even in the embodiment, when the dimming filter is a mirror dimming filter configured to greatly dim, than light passing through the hood from the inside to the outside, light passing through the hood from the outside to the inside, the effects obtained with the mirror sheet can be achieved.

The present invention is applicable to a work vehicle provided with a laser radar.

Obviously, numerous modifications and variations of the present invention are possible in light of the above teachings. It is therefore to be understood that within the scope of the appended claims, the invention may be practiced otherwise than as specifically described herein.

What is claimed is:

1. A laser radar for a work vehicle, comprising:
   a light emitter configured to emit a laser light, at least part of the laser light being reflected as a reflected light;
   a light receiver configured to receive the reflected light;
   a hood covering the light emitter and the light receiver, the hood having a central axis and a transmission area provided around the central axis;
   a deflection mirror separated from the light receiver and the hood in an axial direction along the central axis, the deflection mirror being rotatable around the central axis to reflect the laser light emitted by the light emitter to direct the laser light toward the transmission area and to reflect the reflected light from the transmission area to direct the reflected light toward the light receiver; and
   a light attenuation layer provided to weaken the reflected light such that the light receiver is configured to receive the reflected light which has been weakened via the light attenuation layer,
   wherein the light attenuation layer extends about an entire perimeter of the central axis.

2. The laser radar according to claim 1, wherein the light attenuation layer is a light attenuation sheet applied to the hood.

3. The laser radar according to claim 2, wherein the light attenuation sheet is a mirror sheet configured to attenuate the reflected light transmitted from an outside of the hood to an inside of the hood more than the laser light emitting from the inside of the hood to the outside of the hood.

4. The laser radar according to claim 1, wherein the light attenuation layer is formed only on an area through which the reflected light is configured to pass.

5. The laser radar according to claim 1, wherein the light attenuation layer is integrally formed on the hood.

6. The laser radar according to claim 1, further comprising:
   a first optical system configured to control the laser light emitted from the light emitter to be transmitted in an emitted light path; and
   a second optical system configured to control the reflected light to be transmitted to the light receiver in a received light path,
   wherein the light attenuation layer is a light attenuation filter selectively movable between an acting position and an evacuation position, the light attenuation filter being provided in the emitted light path and in the received light path when the light attenuation filter is at the acting position, the light attenuation filter neither being in the emitting light path nor in the received light path when the light attenuation filter is at the evacuation position.

7. The laser radar according to claim 6, wherein the light attenuation filter is a mirror light attenuation filter configured to attenuate the reflected light transmitted from an outside of the hood to an inside of the hood more than the laser light emitting from the inside of the hood to the outside of the hood.

8. The laser radar according to claim 1, wherein
   the hood has a side surface surrounding the central axis, and
   the transmission area covers more than half of an entire periphery of the side surface of the hood about the central axis.

9. The laser radar according to claim 8, wherein the transmission area extends about the central axis by 270 degrees.

10. The laser radar according to claim 1, wherein the light attenuation layer covers the transmission area.

11. The laser radar according to claim 1, wherein
    the hood has a peripheral wall extending about a circumference of the central axis, and
    the peripheral wall is inclined with respect to the central axis.

12. The laser radar according to claim 11, wherein the peripheral wall has a truncated cone shape.

13. The laser radar according to claim 1, wherein the light emitter is aligned with the central axis.

14. The laser radar according to claim 13, wherein the light receiver is aligned with the central axis.

15. The laser radar according to claim 1, wherein the light receiver is aligned with the central axis.

16. The laser radar according to claim 1, wherein an optical center line of a projection optical system of the light emitter is aligned with the central axis.

17. The laser radar according to claim 16, wherein an optical center line of a reception optical system of the light receiver is aligned with the central axis.

18. The laser radar according to claim 1, wherein an optical center line of a reception optical system of the light receiver is aligned with the central axis.

19. A laser radar for a work vehicle, comprising:
    a light emitter configured to emit a laser light, at least part of the laser light being reflected as a reflected light;
    a light receiver configured to receive the reflected light;
    a hood covering the light emitter and the light receiver, the hood having a central axis and a transmission area provided around the central axis;
    a deflection mirror separated from the light receiver and the hood in an axial direction along the central axis, the deflection mirror being rotatable around the central axis to reflect the laser light emitted by the light emitter to direct the laser light toward the transmission area and to reflect the reflected light from the transmission area to direct the reflected light toward the light receiver; and
    a light attenuation layer provided to weaken the reflected light such that the light receiver is configured to receive the reflected light which has been weakened via the light attenuation layer,
    wherein the light attenuation layer is a light attenuation sheet having a truncated cone shape.

* * * * *